Aug. 14, 1923.
S. S. LUCAS
1,465,017
TIME TABLE
Filed Nov. 7, 1921
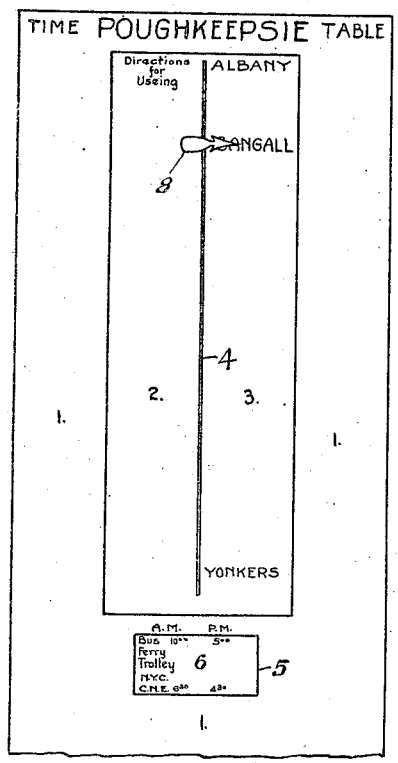
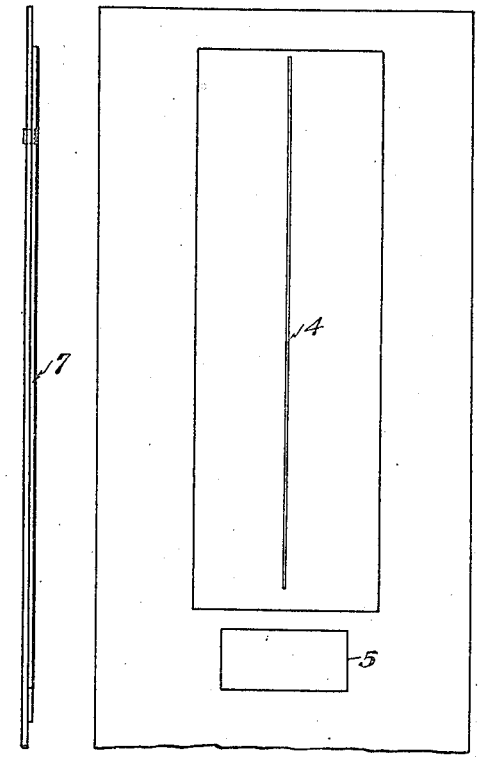
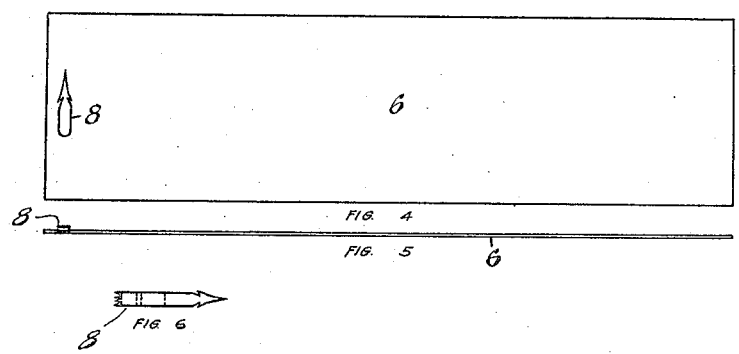
Inventor
Stockwell Sande Lucas Patented Aug. 14, 1923.

1,465,017

UNITED STATES PATENT OFFICE.

STOCKWELL SANDS LUCAS, OF POUGHKEEPSIE, NEW YORK.

TIME TABLE.

Application filed November 7, 1921. Serial No. 513,592.

*To all whom it may concern:*

Be it known that I, STOCKWELL SANDS LUCAS, a citizen of the United States, residing at Poughkeepsie, in the county of Dutchess and State of New York, have invented certain new and useful Improvements in Time Tables, of which the following is a specification.

It is an object of the invention to provide a device so arranged that, by movement of certain of its parts, at the place it is intended to be used, data with respect thereto in reference to any one of a plurality of other places may be caused to be displayed.

Thus, for example, when the device is arranged to be used at Poughkeepsie, certain parts may be moved to cause display of data as to times of departure of trains and other common carriers from that place to any one of a number of other places, train and other common-carrier connections at those latter places, and other information pertaining thereto.

When considered in connection with the description herein, the characteristics of the invention will be apparent from the accompanying drawing, forming part hereof, wherein an embodiment of the invention is disclosed, for purposes of illustration.

Like reference-characters refer to corresponding parts in the views of the drawing, of which—

Fig. 1 is a front elevation;

Fig. 2 is a side elevation;

Fig. 3 is a front elevation, the pointer and data-carrying member being omitted;

Fig. 4 is a plan view of the data-carrying member;

Fig. 5 is a side view of that member; and

Fig. 6 is a view of the pointer.

The device includes a main body member 1, having a plane front surface, made of cardboard, sheet metal, wood, or other suitable material. At the top of the front of the member is placed the name of the place at which the device is to be used; for example, Poughkeepsie, as shown by the drawing.

The member 1 has on its front face to one side of its axis a delineated space 2 for accommodation of directions for using the device, and at the other side of the axis there is a similar delineated space 3 for accommodation of the names of places with relation to which data is displayed by the device.

A slot 4, between the spaces 2 and 3, extends longitudinally and centrally of the body member.

Adjacent to the bottom of the spaces 2 and 3 there is an opening 5 through the body member.

A member 6 of sheet material is disposed and is slidable longitudinally at the back of the body member. This member is held in place by a backing 7 of sheet material.

A pointer 8, positioned on the front of the body member is connected to the member 6 by a portion thereof extending through the slot 4. When the pointer is moved longitudinally of the device, corresponding movement is given to the member 6.

The member 6 has thereon data concerning the places whose names appear in the space 3 in relation to the place whose name appears at the top of the device, this data being arranged to be visible through the opening 5.

The data carried by the member 6 and the pointer are coordinated in such manner with respect to the opening 5 that, when the pointer is brought into registry with a name of a place in the space 3, data concerning that place with respect to the place at which the device is used will be visible through the opening. Thus, for example, assuming that the device is installed at Poughkeepsie and the pointer is in registry with the name Bangall, the time of departure of, and other data concerning, common carriers from Poughkeepsie to Bangall will appear through the opening 5.

When the device provided by the invention is installed in a railroad-station, hotel, or other place, it is unnecessary for a traveler to take the trouble of going through a mass of material, such as contained in an ordinary time-table, to obtain information as to departure of common carriers, etc., from the place he is in to some other place. With this device all he has to do is to move the pointer to the name of the place in the space 3 to which he intends going, and the data he needs instantly will be visible through the opening 5.

The face of the member 1 not occupied by the spaces 2 and 3 and the opening 5 may be utilized for display of advertisements.

Having thus described my invention, what I claim as new, and desire to secure by Letters Patent, is—

A device of the kind described comprising a body member having a longitudinal slot therein and bearing indicia adjacent to said slot, said body member having an opening in alinement with said slot, a sheet material member at the back of said body member having thereon data visible through said opening and pertaining to said indicia, and a pointer connected with the latter member through said slot and arranged to be moved longitudinally of the device and to impart corresponding movement to said data-carrying member, said pointer and data being coordinated to cause display of data pertaining to any indicia with which said pointer may be brought into registry.

STOCKWELL SANDS LUCAS.